United States Patent
Wolfe et al.

(10) Patent No.: US 8,762,026 B2
(45) Date of Patent: Jun. 24, 2014

(54) SYSTEM AND METHOD FOR DETERMINING ENGINE EXHAUST COMPOSITION

(75) Inventors: Kathryn Wolfe, Sterling Heights, MI (US); Darrell W. Burleigh, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 411 days.

(21) Appl. No.: 13/168,033

(22) Filed: Jun. 24, 2011

(65) Prior Publication Data

US 2012/0053821 A1 Mar. 1, 2012

Related U.S. Application Data

(60) Provisional application No. 61/376,502, filed on Aug. 24, 2010.

(51) Int. Cl.
*F01N 3/00* (2006.01)

(52) U.S. Cl.
USPC ............................................. 701/102; 60/274

(58) Field of Classification Search
USPC ................. 701/102, 101, 103, 107, 109, 110; 60/274, 287, 285; 73/114.75, 114.71, 73/114.69
See application file for complete search history.

(56) References Cited

U.S. PATENT DOCUMENTS

| | | | | |
|---|---|---|---|---|
| 6,817,171 B2* | 11/2004 | Zhu | .................................. | 60/274 |
| 7,778,766 B1* | 8/2010 | Cowgill et al. | ............... | 701/108 |
| 2003/0191575 A1* | 10/2003 | Wright | .......................... | 701/104 |
| 2008/0264036 A1* | 10/2008 | Bellovary | ........................ | 60/274 |
| 2010/0218487 A1* | 9/2010 | Wang et al. | ...................... | 60/287 |

FOREIGN PATENT DOCUMENTS

| | | |
|---|---|---|
| DE | 19851319 A1 | 5/2000 |
| EP | 0943786 A2 | 9/1999 |

* cited by examiner

*Primary Examiner* — Mahmoud Gimie
(74) *Attorney, Agent, or Firm* — Quinn Law Group, PLLC (57) ABSTRACT

An engine assembly includes a controller and at least one data storage medium storing a database. The database includes empirically-derived NOx values based on engine equivalence ratio and engine speed at predetermined reference conditions. The controller is configured to retrieve a NOx value from the database that corresponds to a measured value of the equivalence ratio and a measured value of the engine speed, and to modify the NOx value to compensate for differences between the reference conditions and the actual operating conditions of the engine assembly.

16 Claims, 5 Drawing Sheets

SYSTEM AND METHOD FOR DETERMINING ENGINE EXHAUST COMPOSITION

CROSS REFERENCE TO RELATED APPLICATION

This application claims the benefit of U.S. provisional patent application No. 61/376,502, filed Aug. 24, 2010, and which is hereby incorporated by reference in its entirety.

TECHNICAL FIELD

This invention relates to systems for determining the amount of oxides of nitrogen in an exhaust stream.

BACKGROUND

Selective catalytic reduction (SCR) systems are sometimes employed with compression-ignition engines to reduce nitrogen oxides in the exhaust stream. SCR systems require the use of a reductant, such as anhydrous ammonia, aqueous ammonia, or urea in the exhaust stream. A control system regulates the amount of reductant injected into the exhaust stream based on the levels of oxides of nitrogen ($NO_x$) in the exhaust stream. Typically, the control system employs a sensor that measures the levels of $NO_x$ in the exhaust stream to determine how much reductant to inject.

SUMMARY

An engine assembly includes an engine that is characterized by an engine speed having a selectively variable engine speed value, an equivalence ratio having a selectively variable equivalence ratio value, and variable operating conditions each having a respective selectively variable operating condition value. A data storage medium stores a database having, for a plurality of different combinations of engine speed value and equivalence ratio value, a respective estimated amount of oxides of nitrogen (NOx) in the engine exhaust gas for when the variable operating condition values are at predetermined reference values.

A controller is operatively connected to the engine and is configured to monitor the engine speed, the equivalence ratio, and the variable operating conditions to obtain a measured engine speed value, a measured equivalence ratio value, and measured variable operating condition values. The controller is configured to retrieve from the database a reference NOx value that corresponds to the measured engine speed value and the measured equivalence ratio value. The controller is configured to modify the reference NOx value using the variable operating condition values to compensate for variation between the measured variable operating condition values and the predetermined reference values.

The engine system provides an accurate input for dosing an SCR catalyst if a NOx sensor is not ready or is not functioning accurately. It may also used as a diagnostic rationality test for a NOx sensor. The engine system may optimize the efficiency of an SCR catalyst and provides for more robust diagnostics. A corresponding method is also provided.

The above features and advantages and other features and advantages of the present invention are readily apparent from the following detailed description of the best modes for carrying out the invention when taken in connection with the accompanying drawings.

DETAILED DESCRIPTION

Figure 1:
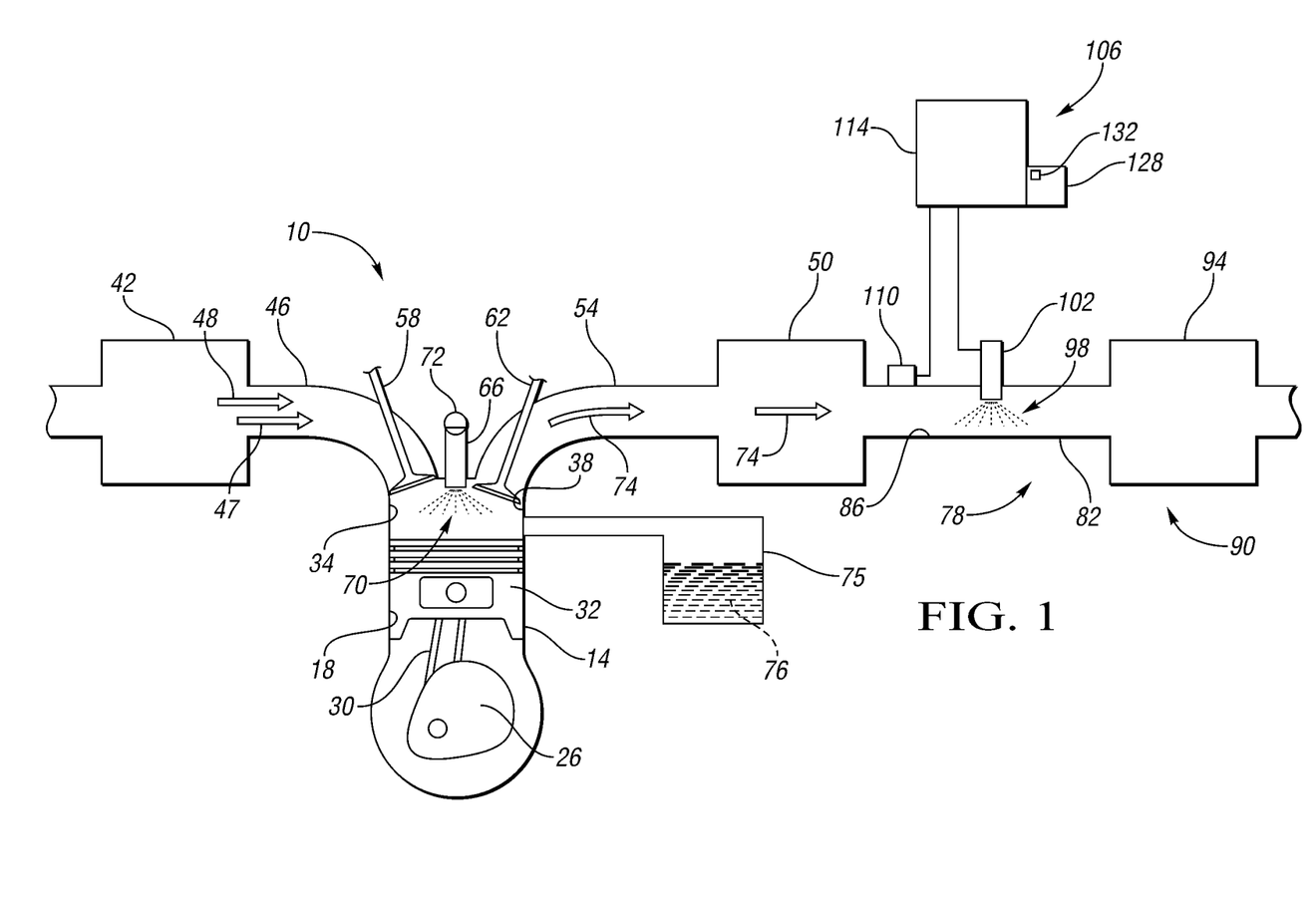
FIG. 1 is a schematic depiction of an engine assembly.

Referring to FIG. 1, a compression-ignition engine 10 is schematically depicted. The engine 10 includes an engine block 14 defining a plurality of cylinders, only one of which is shown at 18. The engine 10 further includes a plurality of pistons, only one of which is shown at 32. Each piston 32 is positioned within a respective one of the cylinders 18 for reciprocal translation therein between a top dead center position and a bottom dead center position, as understood by those skilled in the art.

Each piston 32 is operatively connected to a crankshaft 26 via a respective connecting rod 30 such that the reciprocal translation of each piston 32 causes rotation of the crankshaft 26 and vice versa. Each cylinder 18 includes a respective intake port 34 and a respective exhaust port 38 formed by a cylinder head. Each intake port 34 is in selective fluid communication with an intake plenum or manifold 42 of an air intake system via a respective runner 46 to receive an intake charge including air 47 and, optionally, recirculated exhaust gas 48 (EGR). Each exhaust port 38 is in selective fluid communication with an exhaust manifold 50 via a respective runner 54, as understood by those skilled in the art.

Each cylinder 18 has a respective intake valve 58 associated therewith. Each intake valve 58 is movable between an open position in which the cylinder 18 associated with the intake valve 58 is in fluid communication with the plenum 42 via its respective intake port 34, and a closed position in which the intake valve 58 obstructs a respective one of the intake ports 34 thereby to prevent fluid communication between the cylinder 18 associated with the intake valve and the plenum 42.

Similarly, each cylinder 18 has a respective exhaust valve 62 associated therewith. Each exhaust valve 62 is movable between an open position in which the cylinder associated with the exhaust valve is in fluid communication with the exhaust manifold 50 via its respective exhaust port 38, and a closed position in which the exhaust valve 62 obstructs a respective one of the exhaust ports 38 thereby to prevent fluid communication between the cylinder 18 associated with the exhaust valve and the exhaust manifold 50.

As understood by those skilled in the art, a fuel injector 66 is configured to inject fuel 70 into the cylinder 18 for combustion therein. The fuel injector 66 is in fluid communication with a fuel rail 72 that contains pressurized fuel 70. The products of combustion, i.e., exhaust gas 74, are expelled from the cylinder 18 through the exhaust port 38 during the exhaust stroke of the piston 32. The exhaust gas 74 is transmitted by the runner 54 to the exhaust manifold 50. The engine 10 includes a cooling system 75 having a liquid engine coolant 76 to transfer heat from the engine block 14 to a radiator.

The engine 10 is characterized by an engine speed (i.e., the rotational velocity of the crankshaft 26) having a selectively variable engine speed value, an equivalence ratio having a selectively variable equivalence ratio value, and variable operating conditions each having a respective selectively variable operating condition value. The variable operating conditions include fuel injection timing (i.e., the position of the piston 32 or crankshaft 26 when the injector 66 injects fuel 70), amount of EGR 48, air intake pressure, exhaust pressure, environmental (atmospheric) pressure, air intake temperature, engine coolant temperature, atmospheric humidity, pressure of the fuel rail 72, etc.

The manifold 50 is part of an exhaust system 78 configured to convey the exhaust gas 74 from the engine 10 and to modify the chemical composition of the exhaust gas 74. The exhaust system 78 includes an exhaust conduit 82 that defines a passage 86. The exhaust system 78 further includes a selective catalytic reduction (SCR) system 90, which includes an SCR catalyst 94. Passage 86 provides fluid communication between the manifold 50 and the SCR catalyst 94 such that the conduit 82 conveys exhaust gas 74 from the engine 10 to the SCR catalyst 94.

The SCR system 90 includes a tank (not shown) for storing a reductant 98, such as urea. A reductant injector 102 is configured to inject reductant 98 from the tank into the passage 86 upstream of the SCR catalyst 94. A pump (not shown) may be employed to transmit reductant 98 from the tank to the injector 102. The reductant 98 is employed to convert oxides of nitrogen ($NO_x$) in the exhaust gas 74 into diatomic nitrogen and water.

In order to determine the proper quantity of reductant 98 to inject into the passageway 86, a control system 106 includes a $NO_x$ sensor 110 configured to determine the amount of $NO_x$ (oxides of nitrogen) in the exhaust gas 74, e.g., in parts per million. The control system 106 includes an electronic controller, namely the engine control unit (ECU) 114, which is operatively connected to the injector 102 for controlling the amount of reductant 98 that is injected by the injector 102. The sensor 110 is operatively connected to the electronic controller 114, which receives input from the sensor 110 and determines the proper amount of reductant 98 to inject based on the amount of $NO_x$ in the exhaust gas 74. However, it may be desirable for the controller 114 to have an alternative technique for determining the amount of $NO_x$ in the exhaust gas 74, such as when the sensor 110 has not reached operating temperature, or to check the accuracy of the sensor 110.

The controller 114 includes storage media 128 that includes a database 132 comprising a look-up table or map. The database 132 contains empirically-derived data relating NOx output to equivalence ratio and engine speed at reference conditions. More specifically, the database contains, for a plurality of different combinations of engine speed value and equivalence ratio value, a respective estimated amount of oxides of nitrogen (NOx) in the exhaust gas 74 for when the variable operating condition values are at predetermined reference values. For any given values of the equivalence ratio and the engine speed, the look-up table or map stored in database 132 provides a corresponding $NO_x$ value. Thus, if a value for the equivalence ratio and a value for the engine speed are known, then the database 132 can provide an estimate of the NOx output of the engine 10 when the engine 10 is operating at the reference conditions. The empirically derived $NO_x$ values in the database 132 may be obtained from dynamometer or vehicle based testing of an engine similar or substantially identical to the engine shown at 10 in FIG. 1.

The reference conditions (i.e., the predetermined reference values of the variable operating conditions) may include, e.g., (1) nominal coolant temperature, environmental (barometric) pressure, intake manifold temperature, and humidity; (2) No EGR in intake charge; (3) Rail pressure set at a mid-point calibration ("reference rail pressure"); (4) One small pilot fuel injection (i.e., before the main fuel injection event) if necessary; (5) Fixed APC or fixed engine pressure ratio (i.e., the ratio of intake manifold pressure to exhaust manifold pressure); and (6) best torque injection timing (i.e., the injection timing that achieves maximum engine torque). Other predetermined reference condition values may be employed within the scope of the claimed invention.

The controller 114 is operatively connected to the engine 10, and is programmed and configured to monitor the engine speed, the equivalence ratio, and the variable operating conditions to obtain a measured engine speed value, a measured equivalence ratio value, and measured variable operating condition values. The input variable values, i.e., the measured variable operating condition values, are obtained using sensors (not shown) or otherwise determined by the ECU 114 as understood by those skilled in the art. As used herein, a "measured" value may be measured directly via a sensor, calculated using the inputs of one or more sensors, or otherwise determined or approximated based on information obtained by the controller 114. The controller 114 then retrieves from the database 132 the NOx value ("reference NOx value") that corresponds to the measured equivalence ratio value and measured engine speed value. The controller 114 then determines correction factors (or modifiers) to modify the reference NOx value in order to compensate for any deviation between the measured variable operating condition values and the predetermined reference values, and thereby estimates the amount of NOx being produced by the engine 10.

Figure 2:
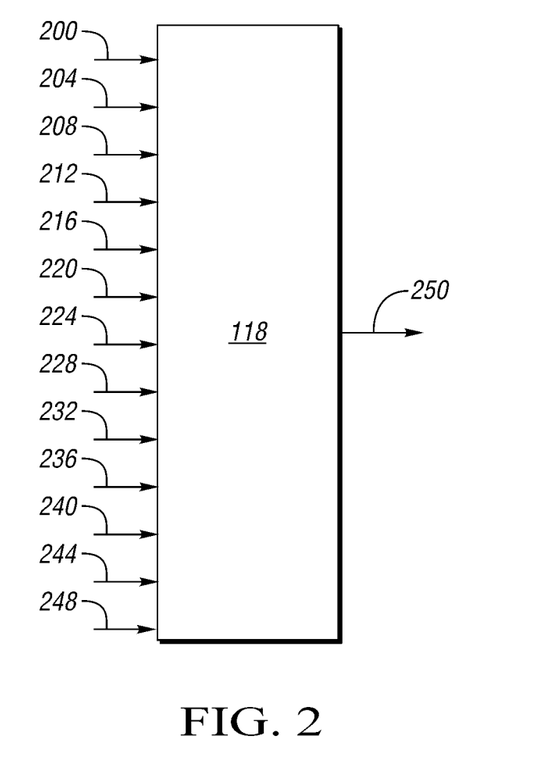
FIG. 2 is a schematic depiction of a method of modeling NOx emissions of the engine assembly of FIG. 1.

The method employed by the controller 114 to estimate the amount of NOx being produced by the engine 10 is shown schematically in FIG. 2 at 118. The method 118 represents an exemplary control algorithm for the controller 114, i.e., the controller 114 is programmed and configured to perform the steps of method 118. The method 118 uses a plurality of input variables, each describing a condition of the engine 10 or its environment. The input variables are the measured variable operating condition values, or are used by the controller to determine the measured variable operating condition values. The input variables include (1) engine speed 200 (i.e., the angular velocity of crankshaft 26); (2) the equivalence ratio 204; (3) rail pressure 208 (i.e., the fuel pressure in rail 72); (4) start of injection timing 212 in crank angle degrees referenced to top dead center for all injections (pulses) in a single cycle; (5) intake manifold oxygen ($O_2$) mass fraction 216 (used to adjust for EGR); (6) intake manifold temperature 220; (7) intake manifold pressure 224 (used to determine engine pressure ratio); (8) engine out exhaust pressure 228 (used to determine engine pressure ratio); (9) environmental pressure 232 (i.e., atmospheric pressure); (10) intake air temperature 236; (11) absolute humidity 240; (12) engine coolant temperature 244; and (13) injection fuel quantities 248 for all pulses and the sum quantity for all pulses in a single cycle. It should be noted that other input variables may be used within the scope of the claimed invention. For example, instead of oxygen ($O_2$) mass fraction, an oxygen ($O_2$) concentration/volume basis may be employed. Similarly, oxygen ($O_2$) mass fraction is used because it is indicative of the amount of EGR, but EGR rate may be used directly.

The method 118 uses the input variables to determine an estimated engine-out $NO_x$ value 250, which may be used by the controller 114 to control the amount of reductant injected by injector 102, or to create an alert that sensor 110 is not functioning. Exemplary alerts may include, for example, an audible sound inside the passenger compartment of the vehicle in which the engine 10 is installed, turning on a lighted sign on the instrument panel of the vehicle, storing an alert in a storage medium for retrieval by a technician, etc.

Figure 3:
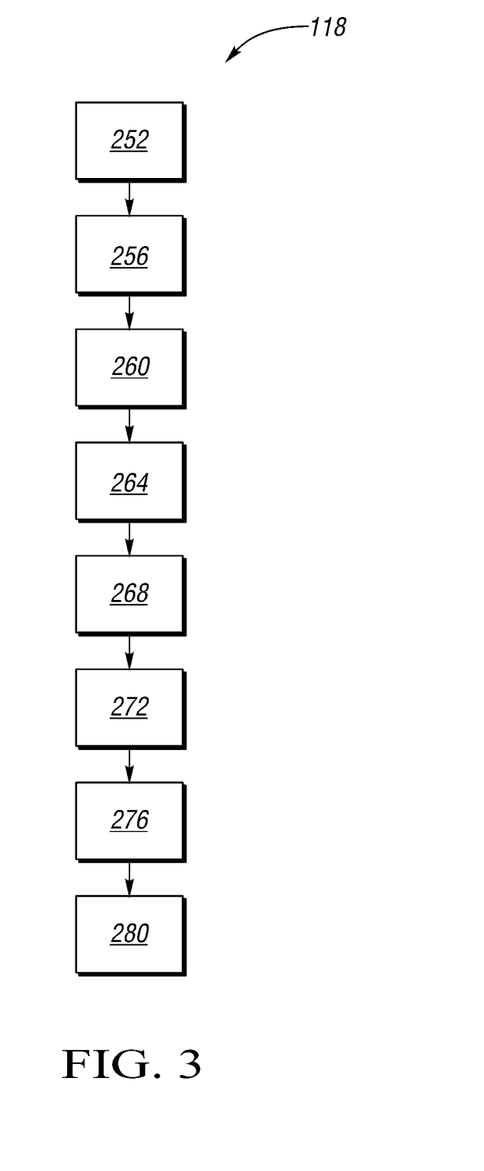
FIG. 3 is a flow chart depicting of the method of FIG. 2.

The method 118 is shown in more detail in FIG. 3. Referring to FIG. 3, the method 118 includes determining the reference NOx value at step 252. As noted above, step 252 includes accessing the database 132 and obtaining the reference NOx value that corresponds to the present values of the engine speed and the equivalence ratio. The $NO_x$ reference value is an estimation of the amount of $NO_x$ produced by the engine 10 for the engine speed and equivalence ratio values of the engine 10 for the given reference conditions. The method 118 includes a series of correction steps to modify the $NO_x$ reference value to reflect conditions of the engine 10 that deviate from the reference conditions. The correction steps include determining a modifier for engine pressure ratio at step 256; determining a modifier for injection timing, injection quantities, and rail pressure at step 260; determining a modifier for EGR 264; determining a modifier for intake manifold temperature at step 268 (temperature at another point in the induction may be substituted); determining a modifier for environmental atmospheric pressure at step 272; determining a modifier for engine coolant temperature at step 276; and determining a modifier for humidity at step 280. In the embodiment depicted, a "modifier" is a correction factor. The controller multiplies the reference NOx value by the modifiers to obtain the engine-out $NO_x$ value 250.

Figure 4:
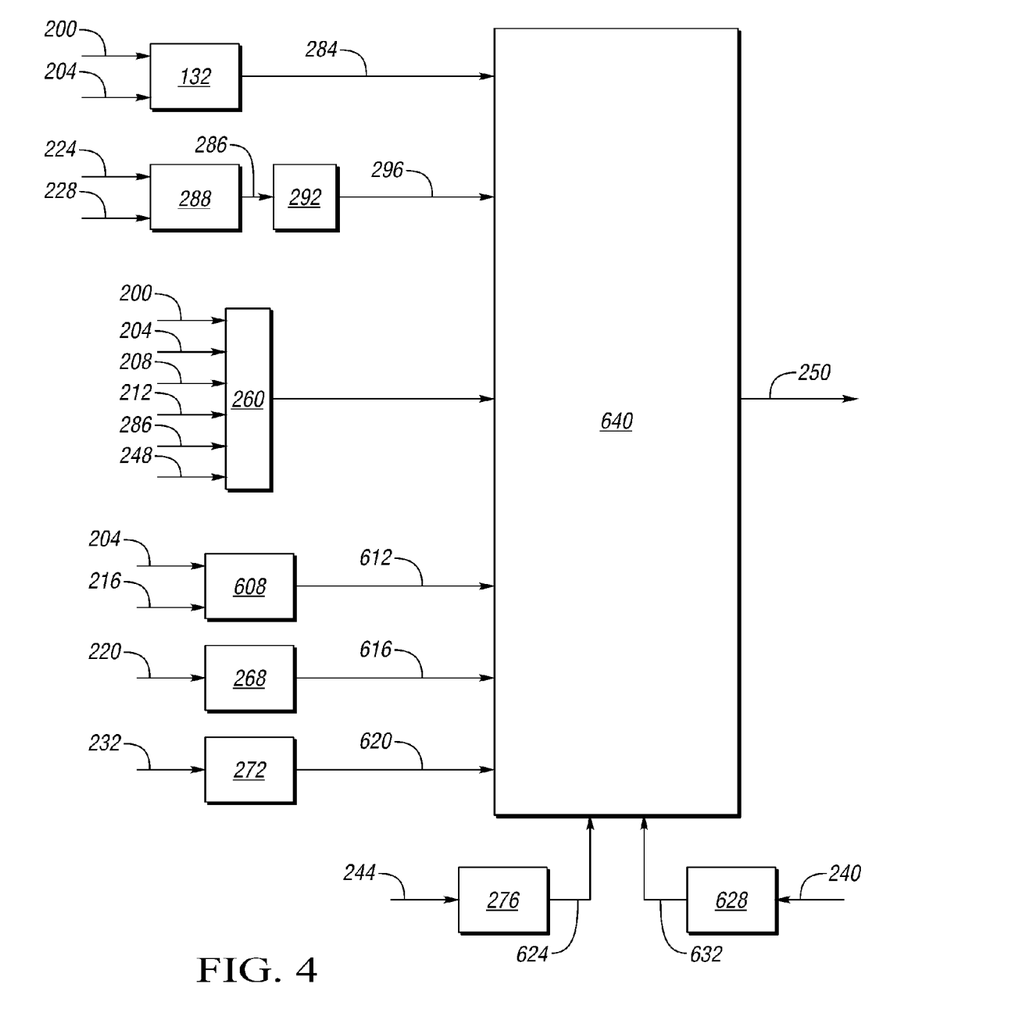
FIG. 4 is another flow chart depicting the method of FIG. 2.

FIG. 4 is a data flow chart that shows steps 252-280 in more detail. Referring to FIGS. 3 and 4, as noted above, step 252 includes accessing the database 132 and obtaining the reference NOx value 284 that corresponds to the present, measured values of the equivalence ratio 204 and the engine speed 200 of engine 10. The $NO_x$ reference value 284 is an estimation of the amount of $NO_x$ produced by the engine 10 for the engine speed 200 and equivalence ratio values 204 of the engine 10 for the given reference conditions.

The engine pressure ratio is the ratio of the intake manifold pressure 224 to the engine out exhaust pressure 228; accordingly, step 256 may include calculating the engine pressure ratio 286 from inputs 224 and 228 at step 288. Step 256 may also include accessing a database 292 to determine a modifier 296 for engine pressure ratio that corresponds to the present, measured engine pressure ratio 286. More specifically, the database 292 includes, for each of a plurality of engine pressure ratio values, a corresponding engine pressure ratio modifier. The values of the engine pressure ratio modifier contained in the database 292 are normalized for what the engine pressure ratio was when the reference NOx map 132 was populated during testing. Thus, for example, if the reference NOx values in database 132 were obtained when the pressure ratio was 0.8, then the engine pressure ratio multiplier 296 would be 1.0 if the present, measured pressure ratio 286 is 0.8; a pressure ratio 286 of 0.7 would thus result in a 0.95 value for the engine pressure ratio modifier 296; and a pressure ratio 286 of 0.9 would thus result in a 1.1 value for the engine pressure ratio modifier 296.

Step 260, determining a modifier for injection timing, injection quantities, and rail pressure, employs the equivalence ratio 204, engine speed 200, fuel rail pressure 208, injection timing 212, pressure ratio 286, and injection fuel quantities 248. One of the reference conditions for the database 132 is fuel injection timing at best torque, i.e., "best torque timing." Accordingly, step 260 is performed to modify the reference NOx value 284 obtained in step 252 to compensate for the difference between best torque timing and the present, measured fuel injection timing.

Figure 5:
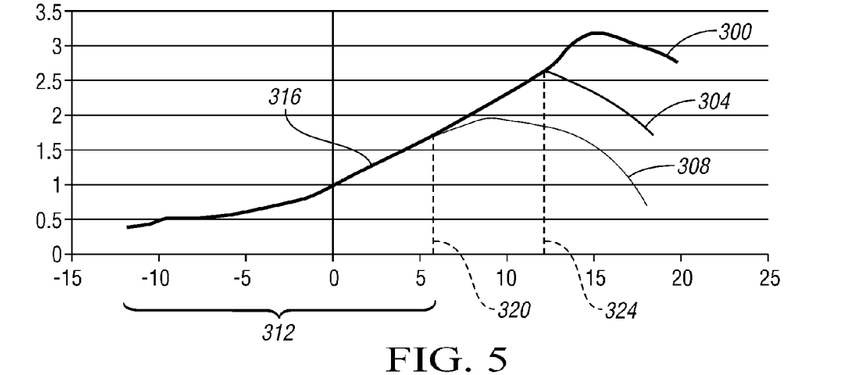
FIG. 5 is a graph representing the relationship between a correction factor and injection timing.

Referring to FIG. 5, a graph depicts the relationship between variation from best torque timing and NOx output. More specifically, the horizontal axis depicts a timing variation value (in crank angle degrees), and the vertical axis depicts the ratio of NOx amount to NOx amount at best torque timing ("NOx ratio" or "injection timing correction factor"— "NOx ratio" and "injection timing correction factor" may be used interchangeably herein). The timing variation values are based on the difference between best torque timing and a measured injection timing value. Accordingly, when the timing variation value is zero (i.e., at best torque timing), the ratio of NOx to NOx at best torque timing is 1.0.

The NOx ratio is dependent upon the engine pressure ratio. The graph of FIG. 5 depicts three lines 300, 304, 308, each depicting the relationship between NOx ratio and timing variation value from best torque timing at a respective engine pressure ratio. More specifically, and in the embodiment depicted, line 300 depicts the relationship between NOx ratio and timing variation value when the engine pressure ratio is 0.7; line 304 depicts the relationship between NOx ratio and timing variation value when the engine pressure ratio is 0.8; and line 308 depicts the relationship between NOx ratio and timing variation value when the engine pressure ratio is 0.9.

The NOx ratio increases with increasing advance from best torque timing. Thus, for example, when the start of injection is 10 crank angle degrees retarded from (after) best torque timing, the NOx ratio is about 0.4, i.e., the engine is producing approximately 40 percent of the NOx that would be produced under similar conditions but at best torque timing. When the start of injection is about 5 degrees advanced from (before) best torque timing, the NOx ratio is about 1.5, i.e., the engine is producing approximately 150 percent of the NOx that would be produced under similar conditions but at best torque timing.

The horizontal axis is normalized, which results in a range 312 of values on the horizontal axis for which the NOx ratio is substantially identical for each of the engine pressure ratios. Accordingly in the range 312, lines 300, 304, 308 converge into a single line 316 (i.e., a standard NOx ratio curve). The lines 300, 304, 308 diverge from line 316 at different values along the horizontal axis, and the point of divergence from the standard NOx ratio curve line 316 is a function of engine pressure ratio. For example, line 308 diverges at value 320, and line 304 diverges at value 324. The lines 300, 304, 308 diverge because NOx production is reduced due to poor combustion as injection timing advances. However, for any given engine pressure ratio, the standard NOx ratio curve line 316 can be used to determine a modifier for injection timing so long as the timing is below the point of divergence for the engine pressure ratio. There are separate maps (not shown) to modify the curve (316) based on when combustion becomes poor, i.e., when the NOx output diverges from the standard NOx ratio curve. One of the separate maps defines the crank angle degree at which peak NOx occurs and where it begins to drop off, which is a function of equivalence ratio and pressure ratio. Another of the separate maps contains decay modifiers that decays off the injection timing modifier. The decay modifiers are a function of pressure ratio and crank angle degree from peak NOx.

Figure 6:
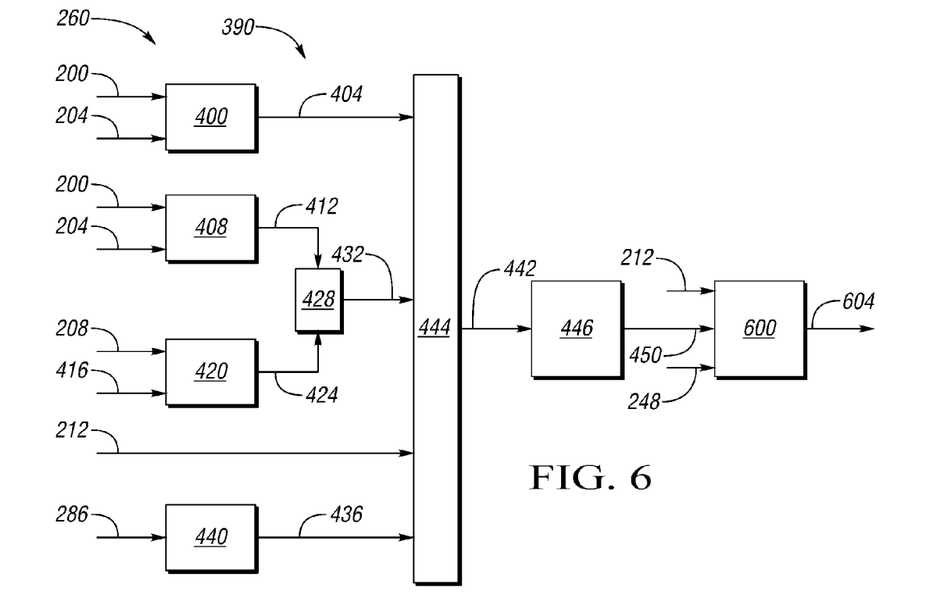
FIG. 6 is a flow chart depicting a method of using the graph of FIG. 5.

Since the horizontal axis is normalized, part of determining a modifier for injection timing (step 260) includes determining the present variation from best torque timing such that it is normalized, which is shown at 390 in FIG. 6. More specifically, at step 390, the controller 114 determines a timing variation value 442. Referring to FIG. 6, the timing variation value (or "delta advance") is equal to: (SOI of the injection pulse)−(best torque SOI angle found when database 132 was populated)+rail pressure offset+engine pressure ratio offset, where SOI is the start of the injection event (in crank angle degrees) and is the measured injection timing value. Using database 400, the best torque timing 404 (at the reference rail pressure) is obtained with the equivalence ratio 204 and the engine speed 200.

The rail pressure offset is determined using the following equation:

$$\text{Rail pressure offset} = \text{load\_gain} \times \left[\left(\sqrt{\frac{\text{rail\_pressure}}{\text{reference\_rail\_pressure}}}\right) - 1\right]$$

The load gain 412 is determined from database 408 using the equivalence ratio 204 and the engine speed 200. At 420, the square root of the rail pressure 208 divided by the reference rail pressure 416 is determined, and then 1 is subtracted from the result to determine value 424. Value 424 is multiplied by the load gain 412 at 428 to determine the rail pressure offset 432.

The engine pressure ratio offset 436 is determined from database 440 using the engine pressure ratio 286. The delta advance 442, or timing variation value, is determined at 444 by subtracting the best torque timing 404 from the injection timing 212, and adding the rail pressure offset 432 and the pressure ratio offset 436. A second database 446 stored in the data storage media 128 contains the same information as the graph in FIG. 5, and thus contains, for each of a plurality of timing variation values, a respective injection timing correction factor value. The controller 114 is configured to retrieve from the second database 446 the injection timing correction factor value 450 that corresponds to the determined timing variation value 442, and modifying, as necessary, to adjust for any divergence due to advanced timing. The best torque timing may also need compensation for EGR rate. This can be accomplished by an additional additive map which is a function of, for example, any combination of engine speed, equivalence ratio and intake manifold $O_2$ mass fraction.

Figure 7:
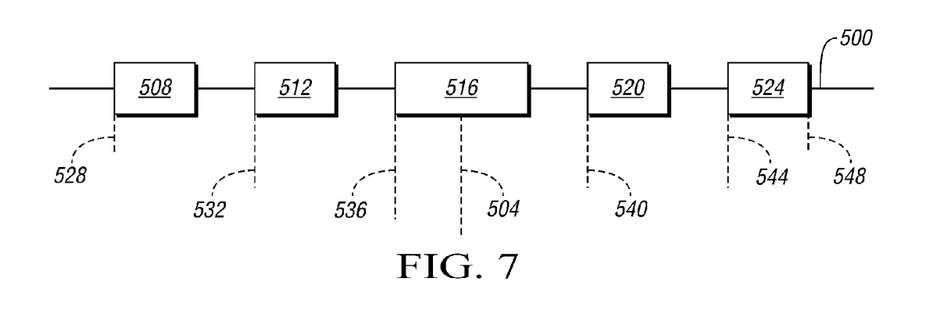
FIG. 7 is a graphical depiction of fuel injection events for the engine assembly of FIG. 1.

As understood by those skilled in the art, one cycle may include multiple injection events. However, the reference conditions under which the data of database 132 were obtained include only the main injection event and, if necessary, a small pilot injection. Accordingly, method 118 includes modifying the reference NOx value to compensate for multiple injection events. FIG. 7 is a graphical, schematic depiction of multiple injection events during a compression stroke of the piston 32 and the subsequent power stroke. Referring to FIG. 7, line 500 represents crank angle degrees, with top dead center (TDC) of the piston 32 at 504. Before the piston 32 reaches top dead center, during a compression stroke, one or two pilot injections 508, 512 may occur to reduce engine noise. The main injection 516 occurs at or around TDC; as shown in FIG. 7, the main injection may begin before or after TDC and be of sufficient duration to continue after TDC. Post-injection events 520, 524 may also occur during the power stroke. Although five different injection events are shown, more or fewer injection events may be employed by an engine controller within the scope of the claimed invention.

Each of the injection events 508, 512, 516, 520, 524 has a respective measured injection timing value, which is the respective "start of injection" value 528, 532, 536, 540, 544. Each of the injection events 508, 512, 516, 520, 524 occurs for a respective duration (in crank angle degrees) during which a respective mass of fuel is injected into the cylinder via the fuel injector 66. Referring again to FIG. 6, step 260 includes compensating for multiple injection events (at step 600).

At step 600, the controller 114 determines a final NOx ratio 604, which accounts for multiple injection events, by calculating, for each of the injection events 508, 512, 516, 520, 524, a respective fuel weight. The fuel weight of an injection event is the mass of fuel injected during the injection event divided by the total mass of fuel injected during all of the injection events 508, 512, 516, 520, 524. The controller 114 is configured to retrieve from the second database 446 a respective timing correction factor value 450 for each of the measured injection timing values 528, 532, 536, 540, 544, i.e., the step 390 is performed for each of the injection events 508, 512, 516, 520, 524, with the input 212 being the measured injection timing values 528, 532, 536, 540, 544 to determine a respective timing correction factor value 450 for each of the injection events 508, 512, 516, 520, 524.

Then, at step 600, the controller 114 determines a final injection timing correction factor value 604 that accounts for all of the injection events is calculated using the following formula: Final injection timing correction value=(injection timing correction factor value for the first pilot X fuel weight of the first pilot X decay term for the first pilot)+(injection timing correction factor value for the second pilot X fuel weight of the second pilot X decay term for the second pilot)+(injection timing correction factor value for the main injection X fuel weight of the main injection)+(injection timing correction factor value for the first post injection X fuel weight of the first post injection)+(injection timing correction factor value for the second post injection X fuel weight of the second post injection).

The decay terms allow the contribution of NOx to be walked out as the pilots get farther away from the main injection. The decay term is determined from a look-up table of multipliers as a function of degrees advanced from the main injection SOI so that an injection event at a farther angle can have a NOx ratio term decayed out to zero.

Figure 8:
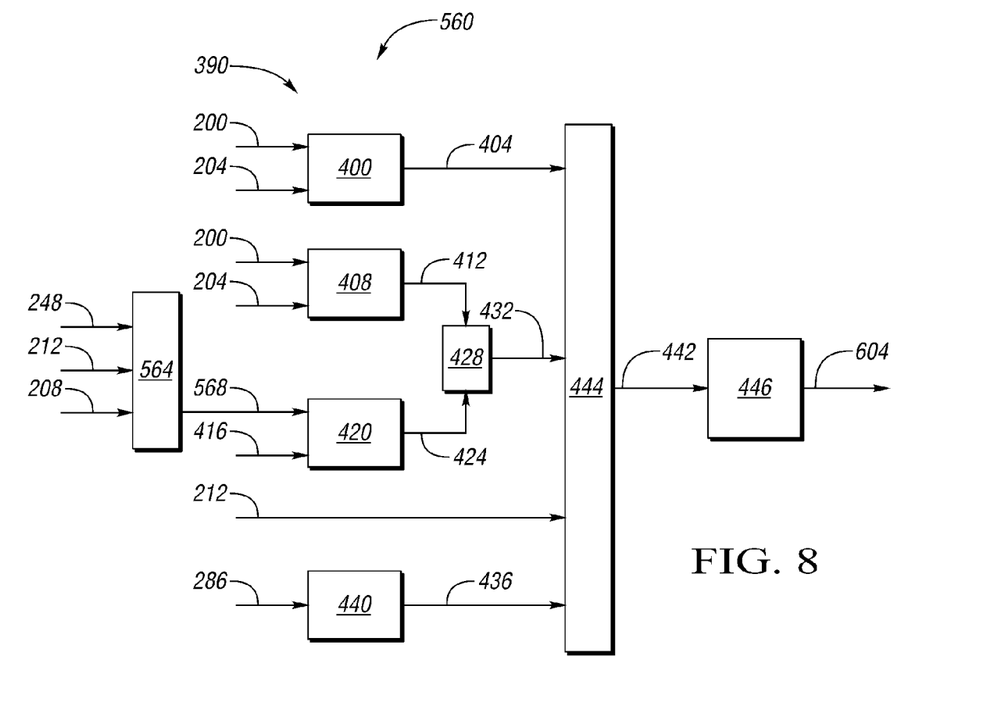
FIG. 8 is a flow chart for determining a final fuel injection timing correction factor value.

Referring to FIG. 8, an alternative to step 260 is schematically shown at 560. The controller 114 may perform step 560 instead of step 260 in order to determine the final injection timing correction factor value 604. Step 560 includes determining an effective rail pressure value 568 at step 564 using injection timing 212, injection fuel quantities 248, and rail pressure 208. More specifically, the actual fuel mass flow rate is equal to the delivered fuel mass (i.e., injected fuel mass) divided by the total time the injector is on (i.e., the total time of the injection events, not including the time between events). The average fuel mass flow rate is equal to the delivered fuel mass divided by the total fuel injection time. The total fuel injection time is the time from the start of injection 528 of the first injection event 508 to the end of injection 548 of the last injection event 524. The engine speed is relatively constant over the time of interest; accordingly, the time can be effectively measured in crank angle degrees if desired. The effective rail pressure is equal to the rail pressure X (actual fuel mass flow rate/average fuel mass flow rate)$^2$. The controller 114 calculates the effective rail pressure using the above formula at step 564. Step 560 includes performing step 390, using the effective rail pressure value 568 as the input for rail pressure at step 420, along with the start of injection 528 of the first injection event 508, to look up the final NOx ratio as if it were a single injection event. That is, at step 390, the start of injection 528 of the first injection event 508 is used as the value for input 212, and the effective rail pressure value 568 is used as the value for rail pressure at step 420. The value then obtained from database 446 is used as the final injection timing correction factor value 604.

Referring again to FIGS. 3 and 4, the controller is configured to determine a modifier for EGR (step 264) by using the equivalence ratio 204 and the oxygen mass fraction 216 to determine the corresponding EGR modifier 612 from a database 608. The equivalence ratio 204 is used as a way to compensate for changes in the exhaust specific heat. The controller 114 is configure to determine a modifier 616 for intake manifold temperature at step 268. The controller is configured to determine a modifier 620 for environmental atmospheric pressure at step 272 using atmospheric pressure 232. The controller 114 is configured to determine a modifier 624 for engine coolant temperature at step 276 using the coolant temperature 244. The controller 114 is configured to determine a modifier 632 for humidity (step 280) by finding modifier value that corresponds to humidity 240 in database 628.

The controller calculates the estimated engine-out $NO_x$ value 250 (in parts per million) at 640 using the following equation: engine-out $NO_x$ [250]=Reference $NO_x$ value [284]×$NO_x$ ratio [604]×EGR correction [612]×Engine Pressure Ratio Correction [296]×Environmental Pressure Correction [620]×Intake Temperature Correction [616]×Coolant Correction [624]×Humidity Correction [632].

The controller 114 is programmed and configured to selectively perform the method 118, and to employ the estimated engine-out $NO_x$ value 250 to determine the amount of reductant 98 injected by the injector 102 if the sensor 110 is not properly functioning, such as during a sensor malfunction or prior to the sensor 110 reaching its operating temperature. The controller 114 may also use the estimated engine-out $NO_x$ value to determine whether the sensor 110 is malfunctioning by comparing estimated engine-out $NO_x$ value 250 to the sensor 110 output. If the NOx amount indicated by the sensor 110 differs more than a predetermined amount from the estimated engine-out $NO_x$ value, then the controller 114 may transmit a signal to an output device (such as a light in the passenger compartment).

While the best modes for carrying out the invention have been described in detail, those familiar with the art to which this invention relates will recognize various alternative designs and embodiments for practicing the invention within the scope of the appended claims.

The invention claimed is:

1. An engine assembly comprising:
an engine being configured such that the engine selectively generates exhaust gas, and being characterized by an engine speed having a selectively variable engine speed value, an equivalence ratio having a selectively variable equivalence ratio value, and variable operating conditions each having a respective selectively variable operating condition value;
an exhaust system including a conduit defining a passage and being operatively connected to the engine such that the exhaust gas enters the passage;
a data storage medium storing a first database having, for a plurality of different combinations of engine speed value and equivalence ratio value, a respective estimated amount of oxides of nitrogen (NOx) in the exhaust gas for when the variable operating condition values are at predetermined reference values;
a controller operatively connected to the engine and configured to monitor the engine speed, the equivalence ratio, and the variable operating conditions to obtain a measured engine speed value, a measured equivalence ratio value, and measured variable operating condition values;
wherein the controller is configured to retrieve from the first database a reference NOx value that corresponds to the measured engine speed value and the measured equivalence ratio value; and
wherein the controller is configured to modify the reference NOx value using the variable operating condition values to compensate for variation between the measured variable operating condition values and the predetermined reference values.

2. The engine assembly of claim 1, wherein the engine includes an engine cylinder and a fuel injector configured to selectively inject fuel into the cylinder;
wherein one of variable operating conditions is injection timing having a selectively variable injection timing value; and
wherein the predetermined reference value for injection timing is the best torque timing at which the engine achieves the maximum torque output at the other predetermined reference values.

3. The engine assembly of claim 2, wherein the controller is configured to determine a timing variation value;
said timing variation value being based on the difference between best torque timing and a measured injection timing value;
wherein the data storage medium stores a second database containing, for each of a plurality of timing variation values, a respective injection timing correction factor value; and
wherein the controller is configured to retrieve from the second database the injection timing correction factor value that corresponds to the determined timing variation value.

4. The engine assembly of claim 3, wherein the engine assembly is configured such that the fuel injector injects fuel into the cylinder during a plurality of injection events;
wherein each of the injection events has a respective measured injection timing value;
wherein each of the injection events has a respective mass of fuel injected into the cylinder;
wherein the controller is configured to determine a respective fuel weight for each of the injection events;
wherein the fuel weight for an injection event is the mass of fuel injected into the cylinder during the injection event divided by the total mass of fuel injected during all of the plurality of injection events;
wherein the controller is configured to retrieve from the second database a respective timing correction factor value for each of the measured injection timing values;
wherein the controller is configured to, for each of the injection events, multiply the respective timing correction factor value by the respective fuel weight to obtain a respective weighted timing correction factor value; and
wherein the controller is configured to add the respective weighted timing correction factor values to determine a final injection timing correction factor value.

5. The engine assembly of claim 4, wherein the controller is configured to multiply the weighted timing correction factor by a decay term if an injection event is a pilot injection.

6. The engine assembly of claim 3, wherein the engine assembly is configured such that the fuel injector injects fuel into the cylinder during a plurality of injection events;
   wherein the engine assembly includes a fuel rail that is operatively connected to the fuel injector and characterized by a rail pressure;
   wherein the controller is configured to determine a single timing variation value that applies to all of the injection events based on the start of injection of the earliest injection event, the actual fuel mass flow rate during the injection events, the average fuel mass flow rate during the injection events, and the rail pressure; and
   wherein the controller retrieves from the second database the timing correction factor value that corresponds to the single timing variation value.

7. The engine assembly of claim 2, wherein the variable operating conditions include at least one of amount exhaust gas recirculation, intake manifold temperature, barometric pressure, coolant temperature, oxygen mass fraction, oxygen concentration, and humidity.

8. The engine assembly of claim 1, further comprising a reductant injector configured to inject reductant into the exhaust system; and
   wherein the controller controls the amount of reductant injected by the reductant injector based on the modified reference NOx value.

9. A method of estimating the amount of oxides of nitrogen in the exhaust of an engine, the engine being characterized by an engine speed having a selectively variable engine speed value, an equivalence ratio having a selectively variable equivalence ratio value, and variable operating conditions each having a respective selectively variable operating condition value, the method comprising:
   monitoring the engine speed, the equivalence ratio, and the variable operating conditions to obtain a measured engine speed value, a measured equivalence ratio value, and measured variable operating condition values;
   accessing a first database having, for a plurality of different combinations of engine speed value and equivalence ratio value, a respective estimated amount of oxides of nitrogen (NOx) in the exhaust gas for when the variable operating condition values are at predetermined reference values;
   retrieve from the first database a reference NOx value that corresponds to the measured engine speed value and the measured equivalence ratio value; and
   modifying the reference NOx value using the variable operating condition values to compensate for variation between the measured variable operating condition values and the predetermined reference values.

10. The method of claim 9, wherein the engine includes an engine cylinder and a fuel injector configured to selectively inject fuel into the cylinder;
    wherein one of variable operating conditions is injection timing having a selectively variable injection timing value; and
    wherein the predetermined reference value for injection timing is the best torque timing at which the engine achieves the maximum torque output at the other predetermined reference values.

11. The method of claim 10, further comprising determining a timing variation value;
    said timing variation value being based on the difference between best torque timing and a measured injection timing value;
    accessing a second database to obtain an injection timing correction factor value that corresponds to the timing variation value; and
    retrieving from the second database the injection timing correction factor value that corresponds to the determined timing variation value.

12. The method of claim 11, wherein the engine is configured such that the fuel injector injects fuel into the cylinder during a plurality of injection events;
    wherein each of the injection events has a respective measured injection timing value;
    wherein each of the injection events has a respective mass of fuel injected into the cylinder; and
    wherein the method further comprises determining a respective fuel weight for each of the injection events;
    wherein the fuel weight for an injection event is the mass of fuel injected into the cylinder during the injection event divided by the total mass of fuel injected during all of the plurality of injection events;
    retrieving from the second database a respective timing correction factor value for each of the measured injection timing values;
    for each of the injection events, multiplying the respective timing correction factor value by the respective fuel weight to obtain a respective weighted timing correction factor value; and
    adding the respective weighted timing correction factors values to determine a final injection timing correction factor value.

13. The method of claim 12, further comprising multiplying the weighted timing correction factor by a decay term if an injection event is a pilot injection.

14. The method of claim 11, wherein the engine is configured such that the fuel injector injects fuel into the cylinder during a plurality of injection events;
    wherein the engine includes a fuel rail that is operatively connected to the fuel injector and characterized by a rail pressure; and
    wherein the method further comprises determining a single timing variation value that applies to all of the injection events based on the start of injection of the earliest injection event, the actual fuel mass flow rate during the injection events, the average fuel mass flow rate during the injection events, and the rail pressure; and
    retrieving from the second database the timing correction factor value that corresponds to the single timing variation value.

15. The engine assembly of claim 11, wherein the variable operating conditions include at least one of amount exhaust gas recirculation, intake manifold temperature, barometric pressure, coolant temperature, and humidity.

16. The engine assembly of claim 9, wherein the engine includes a reductant injector configured to inject reductant into an exhaust system; and
    controlling the amount of reductant injected by the reductant injector based on the modified reference NOx value.

* * * * *